United States Patent
Toth et al.

(10) Patent No.: US 9,596,709 B2
(45) Date of Patent: Mar. 14, 2017

(54) METHODS, DEVICES, AND COMPUTER PROGRAM PRODUCTS FOR FACILITATING DEVICE-TO-DEVICE COMMUNICATION AMONG WIRELESS COMMUNICATION DEVICES

(71) Applicant: Telefonaktiebolaget L M Ericsson (publ), Stockholm (SE)

(72) Inventors: Stefan Karl Toth, Gothenburg (SE); Roland Gustafsson, Bengtsfors (SE); Gunnar Rydnell, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 14/489,765

(22) Filed: Sep. 18, 2014

(65) Prior Publication Data

US 2015/0078301 A1    Mar. 19, 2015

Related U.S. Application Data

(60) Provisional application No. 61/879,342, filed on Sep. 18, 2013.

(51) Int. Cl.
*H04W 4/00* (2009.01)
*H04W 76/02* (2009.01)
(Continued)

(52) U.S. Cl.
CPC ......... *H04W 76/023* (2013.01); *H04W 4/008* (2013.01); *H04W 4/08* (2013.01); *H04W 76/002* (2013.01)

(58) Field of Classification Search
CPC . H04W 76/023; H04W 4/008; H04W 76/002; H04W 4/08
See application file for complete search history.

(56) References Cited

U.S. PATENT DOCUMENTS

2010/0190518 A1    7/2010  Lindner et al.
2011/0317839 A1*  12/2011  Yoneda ................... H04L 9/085
                                                    380/270
(Continued)

OTHER PUBLICATIONS

International Search Report and Written Opinion issued on Apr. 8, 2015 in related application No. PCT/EP2014/069851, 12 pages.
(Continued)

*Primary Examiner* — Robert Wilson
(74) *Attorney, Agent, or Firm* — Rothwell, Figg, Ernst & Manbeck P.C.

(57) ABSTRACT

A method, device, and computer program product for facilitating device-to-device, D2D, communication among wireless communication devices, WCDs, is provided. The device is a first WCD that receives a wireless packet broadcasted by a second WCD. The wireless packet has one or more of i) a group identifier that identifies a group to which the second WCD belongs and ii) an application identifier that identifies an application which generated at least part of the wireless packet. The first WCD extracts from the wireless packet one or more of the group identifier and the application identifier. The first WCD determines whether to discard the wireless packet based on the one or more of the group identifier and the application identifier extracted from the wireless packet.

23 Claims, 8 Drawing Sheets

(51) Int. Cl.
*H04W 76/00* (2009.01)
*H04W 4/08* (2009.01)

(56) References Cited

U.S. PATENT DOCUMENTS

| | | | |
|---|---|---|---|
| 2012/0063335 A1 | 3/2012 | Cho et al. | |
| 2012/0201197 A1 | 8/2012 | Cha et al. | |
| 2013/0287012 A1* | 10/2013 | Pragada | H04W 76/045 370/338 |
| 2013/0288668 A1* | 10/2013 | Pragada | H04W 12/06 455/426.1 |
| 2014/0056220 A1* | 2/2014 | Poitau | H04W 40/246 370/328 |
| 2014/0112235 A1* | 4/2014 | Jung | H04W 48/16 370/312 |
| 2014/0130137 A1* | 5/2014 | Baek | H04W 12/08 726/4 |
| 2014/0244996 A1* | 8/2014 | Parthasarathy | H04L 63/104 713/150 |
| 2014/0301307 A1* | 10/2014 | Lee | H04L 5/0055 370/329 |
| 2014/0344578 A1* | 11/2014 | Kim | H04L 63/0428 713/168 |
| 2015/0078301 A1* | 3/2015 | Toth | H04W 76/023 370/329 |
| 2015/0312953 A1* | 10/2015 | Wang | H04L 1/00 370/312 |

OTHER PUBLICATIONS

3GPP TR 23.703, V0.5.0, 3rd Generation Partnership Project;Technical Specification Group Services and System Aspects; Study on architecture enhancements to support Proximity Services (ProSe), Release 12, Jul. 2013, 176 pages.

3GPP TR 23.703, V0.45.0, 3rd Generation Partnership Project;Technical Specification Group Services and System Aspects; Study on architecture enhancements to support ProximityServices (ProSe), Release 12, Jul. 2013, 189 pages.

* cited by examiner

METHODS, DEVICES, AND COMPUTER PROGRAM PRODUCTS FOR FACILITATING DEVICE-TO-DEVICE COMMUNICATION AMONG WIRELESS COMMUNICATION DEVICES

CROSS-REFERENCE TO RELATED APPLICATION(S)

This application claims the benefit of provisional patent application No. 61/879,342, filed on Sep. 18, 2013, which application is incorporated by reference herein.

This application is related to international patent application no. PCT/EP2014/069851, which designates the U.S. and was filed on Sep. 18, 2014; said international patent application is incorporated by reference herein.

TECHNICAL FIELD

This disclosure relates to methods, devices, and computer program products for facilitating device-to-device, D2D, communication among wireless communication devices, WCDs.

BACKGROUND

Device-to-device, D2D, communication facilitates interaction among wireless communication devices, WCDs, such as user equipments (UEs), computers, tablets, smartphones, etc., that are within proximity of each other. In particular, WCDs rely on D2D communication to provide proximity-based services (ProSe), in which the WCDs that are within proximity of each other directly exchange application data. Because the WCDs communicate directly with each other, they can provide proximity-based services in areas outside the coverage of a radio area network (RAN).

Some WCDs that are in proximity of each other may form a ProSe group. The ProSe group may be implemented as a private internet protocol, IP, network in which WCDs of the group may securely communicate with each other. A ProSe-enabled WCD may create a ProSe group by autonomously becoming a Group Owner and creating a group identity. The ProSe group can be expanded when other WCDs request to join the group or when other WCDs are invited to join the group. The invitation may be used when two WCDs need to directly communicate. In some cases, only the Group Owner can accept new members (i.e., WCDs) to the group. Thus, all requests to join the group must be sent to the Group Owner, which can be discovered through its broadcasts advertising the presence of the group. When the Group Owner accepts a request for a new ProSe-enabled WCD to join the group, the Group Owner may provide the WCD with the necessary parameters for securing all further communications with the Group Owner.

SUMMARY

The present application relates to processing wireless packets received at a wireless communication device, WCD, and to generating wireless packets for wireless transmission. The techniques discussed herein facilitate device-to-device, D2D, communication among WCDs, such as for WCDs that provide proximity-based services, ProSe, in an area that is within or outside of network coverage.

ProSe in an area relies on WCDs communicating directly with each other, either in a one-to-one mode or in a one-to-many mode (e.g., a broadcast mode). As the number of WCDs in an area increases, signal traffic increases as well. The signal traffic may arise, for instance, from wireless packets (i.e., packets transmitted or to be transmitted wirelessly) that are generated and broadcasted from a multitude of applications running on a multitude of WCDs. A WCD (such as a user equipment, UE) thus needs an efficient mechanism to determine which of these many wireless packets are relevant and to route the relevant wireless packets to an appropriate application running on the WCD.

As a WCD receives wireless packets that have been broadcasted over the air, it may determine the relevance of such packets based on what ProSe group each of the packets are addressed to. That is, when two WCDs in an area need to exchange application data, they may become members of the same ProSe group so as to be able to communicate the data in a secure way. The ProSe group may be newly formed or may be preexisting. The WCD may assume that packets received from another member of one of the WCD's ProSe groups are relevant to the WCD, while packets from all other WCDs do not concern it. Thus, the WCD may discard (e.g., ignore) wireless packets from another WCD if the two WCDs do not share membership in a ProSe group.

To facilitate this screening of wireless packets based on ProSe group membership, a group identifier (a.k.a., group ID) may be provided in a header of the wireless packets. The WCD may extract and analyze the group ID in a protocol layer for ProSe-related processing (i.e., a ProSe layer). This layer may be lower than a layer occupied by applications running on the WCD (i.e., application layer). If the ProSe layer determines that the wireless packet is of no interest to the WCD, it may discard (e.g., ignore) the packet and avoid incurring the processing cost of passing the packet to the application layer. In some instances, while packet data being communicated between ProSe members is encrypted, the group ID in the packet header is not encrypted. The lack of encryption simplifies the extraction and analysis of the group ID in the ProSe layer. The screening reduces the burden on the application layer of the WCD by passing only packets that are of interest to the WCD—those from one of the WCD's ProSe groups—to the application layer. That is, the screening relieves applications in the application layer from having to attempt to decrypt every wireless packet received by the WCD.

Because proximity-based services involve a variety of different applications, an application identifier (a.k.a., application ID or app ID) may be provided in the packet header to facilitate routing the wireless packet to an appropriate application running on the WCD. For instance, a voice application running on one WCD may include a corresponding application ID and group ID in a wireless packet before broadcasting the packet. Another WCD that receives the broadcasted packet may be running or configured to run numerous ProSe-enabled applications, such as the voice application, a video application, a file sharing application, a messaging application, any other ProSe-enabled application, or any combination thereof. The ProSe layer of the receiving WCD may use the application ID to route the wireless packet to the voice application.

The application ID may also be used, along with the group ID, to screen wireless packets. In some cases, the group ID may not be unique among ProSe groups in an area. That is, a group owner may select a group ID without considering the group IDs chosen for other ProSe groups. Thus, there is a possibility that two or more ProSe groups in an area may have the same group ID. In such situations, the ProSe layer may incorrectly conclude that a wireless packet is from one of the WCD's ProSe groups, when the wireless packet is in fact from another ProSe group that happens to have the same group ID.

The application ID may be used to address this issue because the application ID may be guaranteed to be unique. For example, each application may have had to register with a registration organization or application distributor, which could issue a unique application ID to the application. This unique application ID may be used in the screening performed in the ProSe layer.

In one aspect of the present disclosure, a method is provided for processing wireless packets received at a first WCD. For instance, the first WCD receives a wireless packet broadcasted by a second WCD. The wireless packet may have one or more of i) a group identifier that identifies a group to which the second WCD belongs and ii) an application identifier that identifies an application which generated at least part of the wireless packet.

The first WCD may extract from the wireless packet one or more of the group identifier (i.e., a group ID) and the application identifier (i.e., an application ID). In some cases, the group ID and application ID may be extracted from a header (e.g., ProSe header) of the wireless packet. In some cases, applications may run on an application layer on the first WCD, and the extraction may be performed at a protocol layer that is lower than the application layer.

The first WCD may determine whether to discard the wireless packet based on the one or more of the group identifier and the application identifier (i.e., based on one or more of the group ID and/or the application ID) extracted from the wireless packet.

In some instances, the first WCD stores subscription information that identifies at least one of i) an application stored on the first WCD and configured to communicate with other WCDs, and ii) a group of WCDs to which the first WCD belongs. The first WCD may determine whether to discard the wireless packet by determining whether the stored subscription information matches at least one of the group identifier and the application identifier (e.g., whether the stored subscription information matches the group identifier and the application identifier). For example, the subscription information may include a set of subscription identifiers that each consists of: i) a group ID of the first WCD, ii) an application ID of an application stored on the first WCD, or iii) a tuple consisting of the group ID and the application ID. Accordingly, the subscription information may identify at least one of: (1) which applications on the first WCD are communicating with other WCDs, and (2) what groups, such as proximity-enabled service (ProSe) groups, the first WCD belongs to. In an embodiment, the subscription information identifies (1) what applications on the first WCD are communicating with other WCDs, and (2) what groups, such as ProSe groups, are each of the applications communicating with. The first WCD may determine whether at least one of the extracted group ID and application ID matches a subscription identifier, such as by determining whether any of the subscription identifiers matches the group ID from the packet header, the application ID from the header, or a tuple consisting of the group ID and the application ID from the header.

In some instances, the group identifier is shared by at least two different groups of WCDs, while the application identifier is unique among all applications that are configured to run on the first WCD.

In some instances, in response to a determination that there is no match between the subscription information and at least one of the extracted group identifier and application identifier, the first WCD may discard (e.g., ignore) the received wireless packet.

In some instances, a plurality of applications are stored on the first WCD, and in response to determining not to discard the wireless packet (e.g., in response to a determination that there is a match between the subscription information and at least one of the group ID and application ID), the first WCD may route the received wireless packet to one of the plurality of applications corresponding to the extracted application identifier.

In some instances, the wireless packet includes a routing control field that indicates whether the wireless packet is to be routed to at least one of: i) the application corresponding to the application identifier, ii) a control application, and iii) a relay node that relays the wireless packet to a base station, wherein the first WCD extracts the routing control field and the routing is based on the routing control field and the application identifier.

After the wireless packet has been routed to an appropriate application, the application may process the wireless packet based on the extracted group ID. In some instances, at least a portion of the wireless packet is encrypted, and the first WCD extracts the group identifier and decrypts the encrypted portion of the wireless packet based on the extracted group identifier. In some cases, the first WCD performs the decryption by determining a decryption key based on the group identifier.

In some instances, the first WCD generates the subscription information by i) running an application that determines an application identifier of the application and a group identifier of the group to which the first WCD belongs, ii) generating a subscription identifier that combines the determined application identifier and the determined group identifier; and iii) adding the subscription identifier to the subscription information stored on the first WCD. In an embodiment, the subscription identifier may be a concatenation of the application ID and the group ID. The subscription information is matched against the received wireless packet to determine if the wireless packet is of interest to the first WCD. In one instance, a group ID in the wireless packet is matched against group IDs identified by the subscription information. If the group ID in the packet matches any group ID of the subscription information, the wireless packet may be determined to be of interest to the first WCD. In one instance, a combination of the application ID and the group ID in the wireless packet is compared against subscription identifiers of the subscription information. Each subscription identifier may identify an application running on the WCD that is engaged in D2D communication and identify a group (e.g., ProSe group) to which the D2D communication is directed. If the combination of the application ID and the group ID matches any subscription identifier, then the wireless packet may be determined to be of interest to the first WCD. The wireless packet may then be routed to an appropriate application.

In some cases, the subscription information may be set by one or more applications running on the WCD, based on a determination that the first WCD has become a member of a group of WCDs, such as a ProSe group. In an embodiment, the application may have caused the WCD to form a new ProSe group or to have joined a preexisting ProSe group. The application may have become a member of the group of WCDs in order to perform D2D communication with other members of that group.

In some instances, the first WCD extracts a routing control field from the wireless packet. The routing control field may have a value indicating that the wireless packet is to be routed to a control application or relay node identified by the field. The routing control field may take precedence over the application ID. If the routing control field does not indicate that the wireless packet is to be routed to a control application or relay node, it may instead indicate that the wireless packet is to be routed to an application indicated by the application ID. In this situation, the first WCD routes the wireless packet to an application corresponding to the application ID.

In another aspect of the present relates to a first WCD. The first WCD of this aspect includes a transceiver a transceiver configured to receive a wireless packet broadcasted by a second WCD. The wireless packet has one or more of i) a group identifier that identifies a group to which the second WCD belongs and ii) an application identifier that identifies an application which generated at least part of the wireless packet. The first WCD further includes one more processors configured to extract from the wireless packet one or more of the group identifier and the application identifier, and determine whether to discard the wireless packet based on the one or more of the group identifier and the application identifier extracted from the wireless packet.

In another aspect of the present disclosure, a method for broadcasting wireless packets by a second WCD is provided. An application running on the second WCD may generate application data to be communicated to the same application on one or more other WCDs, wherein the second WCD and the one or more other WCDs belong to a group used for device-to-device communication. The second WCD may determine a group identifier corresponding to the group, and may determine an application identifier corresponding to the application. The second WCD may generate a wireless packet that includes the group identifier, the application identifier, and the application data, and may broadcast the wireless packet.

In some instances, the group ID may be determined based on which encryption key, which varies based on what ProSe group the application data is directed toward, is used to encrypt the application data. The second WCD may generate the wireless packet by encrypting the application data using the group ID.

In some instances, the second WCD may generate a packet that includes the application ID and the group ID in a packet header. In an embodiment, the application ID and the group ID may be concatenated, and may be part of a header address.

In another aspect of the present relates to a second WCD. The second WCD of this aspect includes one or more processors. The one or more processors are configured to run an application on the second WCD to generate application data to be communicated to the same application on one or more other WCDs, wherein the second WCD and the one or more other WCDs belong to a group used for device-to-device communication. The processor(s) are further configured to determine a group identifier corresponding to the group, determine an application identifier corresponding to the application, and generate a wireless packet that includes the group identifier, the application identifier, and the application data. The second WCD further includes a transceiver configured to transmit the wireless packet.

Features, objects and advantages of the present disclosure will become apparent to those skilled in the art by reading the following detailed description where references will be made to the appended figures in which;

The above and other aspects and embodiments are described in further detail below.

DETAILED DESCRIPTION

Figure 1:
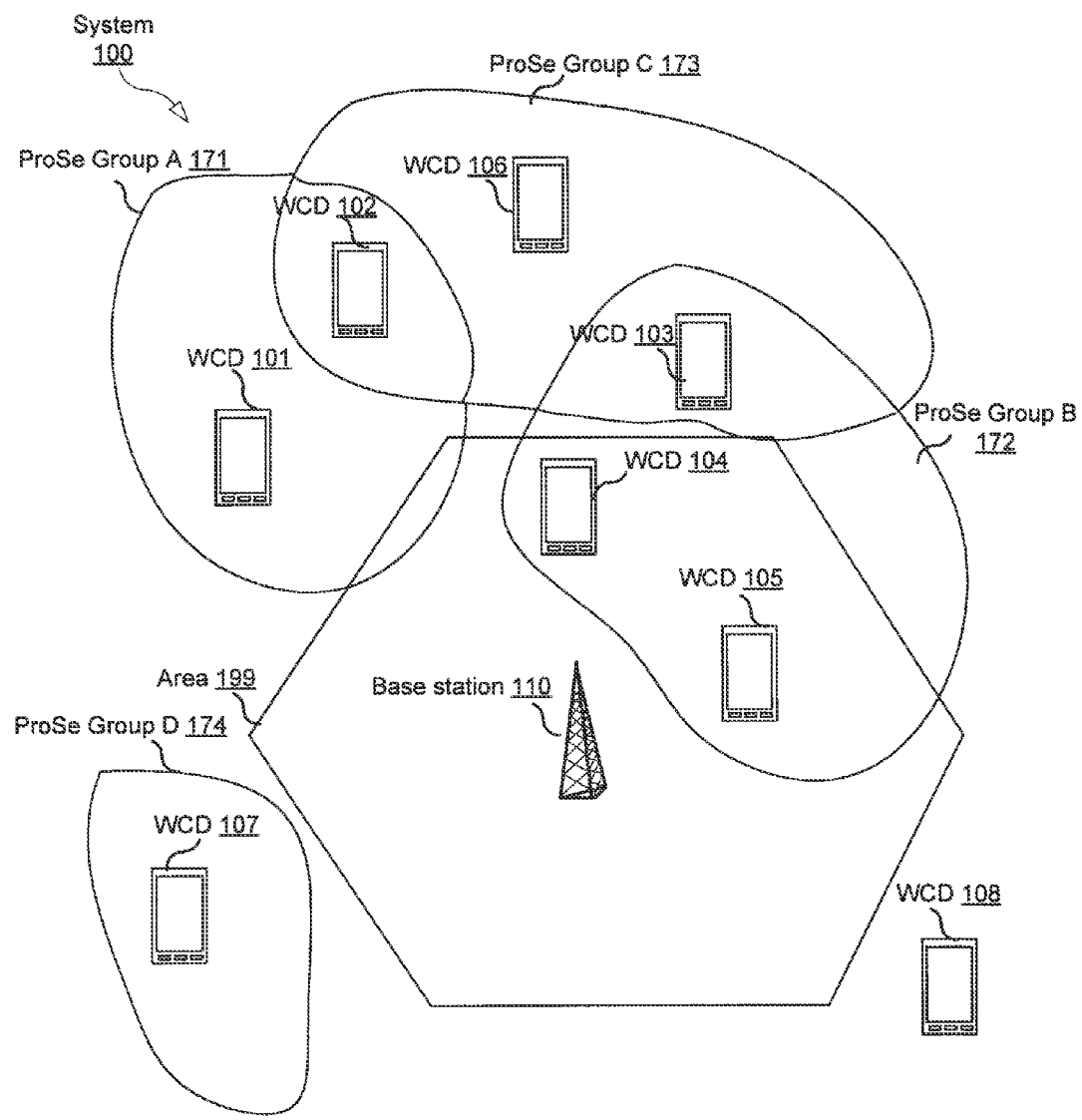
FIG. 1 illustrates a number of proximity service, ProSe, groups and WCDs of those groups, according to an aspect of the present disclosure.

The present application is concerned with device-to-device, D2D, communication among wireless communication devices, WCDs, such as user equipments (UEs) and/or other devices having the capability to communicate wirelessly, and more specifically with how a WCD processes wireless packets broadcasted by other WCDs. Processing of the wireless packets may involve, for example, screening the wireless packets and/or routing the wireless packets to an appropriate application on the WCD.

Screening a wireless packet may involve determining whether the packet is of interest to the WCD. As the number of WCDs in an area increases, the number of packets broadcasted (i.e., transmitted wirelessly) by the WCDs may also increase. These wireless packets may be communicated between WCDs that are in proximity of each other, so as to implement proximity-based (ProSe) services. However, a wireless packet broadcasted by one WCD may be relevant to only a certain application running on some WCDs. Stated differently, a WCD may receive many wireless packets which are not relevant to the WCD, and in which the WCD has no interest. The WCD thus needs an efficient way to screen the wireless packets to identify relevant packets and to route the relevant packets to an appropriate application.

In an embodiment, a wireless packet is of interest to a WCD only if the packet is directed toward (e.g., only if it is addressed to) a ProSe group to which the WCD belongs. More particularly, the WCDs in an area may organize into different groups to communicate with each other. For instance, several users may wish to communicate with each other using a voice application running on their WCDs, and may thus form a ProSe group that includes their WCDs. In one example, the WCDs may all join a preexisting ProSe group. In another example, one of the WCDs may form a new ProSe group, and the other WCDs may join the new ProSe group by invitation or request. The WCDs of a group may, for example, share an encryption parameter that allows members of the group to decrypt wireless packets addressed to the group. The parameter is not shared with members outside the group.

A WCD in a ProSe group may transmit packets in a broadcast mode. A broadcasted wireless packet may reach not only group members in proximity of the broadcasting WCD, but may also reach other WCDs that are not a part of the group. Because those WCDs cannot decrypt the broadcasted wireless packets, the packets are of no use to those WCDs. Accordingly, any of those WCDs may screen received wireless packets and accept only wireless packets addressed to a ProSe group to which that WCD belongs. It may reject any other wireless packet, such as by discarding (e.g., ignoring) the wireless packet.

An application running in an application layer of the WCD may configure a lower protocol layer to screen the wireless packets. Performing the screening at the lower protocol layer reduces the burden at the application layer, by relieving the application from having to attempt to decrypt each wireless packet received by the WCD. In an embodiment, the application may configure the lower protocol layer by notifying the lower protocol layer of the wireless packets to which the application is subscribing. In some scenarios, the subscription is based on group membership. That is, the application may manage the formation of a new ProSe group or joining of a preexisting ProSe group, and then subscribe to wireless packets from members of that ProSe group. To represent this subscription, the application may generate a subscription identifier that is a combination of the application's identifier and the group's identifier. The application may notify the lower protocol layer of the new subscription identifier, which is then used by the lower protocol layer to screen received wireless packets.

After the lower protocol layer screens the wireless packets received by the WCD, it may route relevant wireless packets to an appropriate application at the application layer. This routing allows an application (e.g., voice application, video application, messaging application) running on one WCD to communicate with the same application running on another WCD. As described in more detail below, the routing may be based on an application ID (e.g., an application ID) in a header of the packet.

In some instances, the header of the packet may include a routing control field in addition to the application ID. The lower protocol layer may route a wireless packet based on the routing control field and the application ID.

FIG. 1 illustrates a system 100 having a plurality of WCDs 101-108 that provide proximity-based services. Some of the WCDs may be in an area that lacks network coverage (e.g., WCDs 101, 102, 103, 106, 107, and 108), and some of the WCDs may be in an area 199 that has network coverage (WCDs 104, 105). In the illustration of FIG. 1, the network coverage area 199 is provided by a base station 110. The proximity-based services (ProSe) may be provided through device-to-device (D2D) communication between WCDs that are in proximity of each other. WCDs may be considered to be in proximity when, for instance, when they are within each other's broadcast range.

The D2D communication allows WCDs to provide proximity-based services without assistance from a radio access network (RAN). As an example, as illustrated in FIG. 1, although WCD 103 is outside the network coverage area 199 of base station 110, WCD 103 may still use D2D communication to communicate data with other WCDs, such as WCD 104 or WCD 106, that are in proximity to WCD 103. In some instances, the communicated data may be data for the same application running on different WCDs. The ability to provide proximity-based services outside of network coverage may be used in a public safety setting, allowing applications on WCDs to communicate even when one of them is not within range of a base station 110 or a relay node.

Even when WCDs are in the network coverage area 199, the proximity-based services may still reduce the load that would have been placed on the network (e.g., on the base station that provides services to the WCDs in area 199). For instance, although WCD 104 and WCD 105 in FIG. 1 are within the coverage of base station 110, they may communicate via D2D communication rather than through the base station 110, thus avoiding increasing the load on the base station 110.

To provide proximity-based services, applications on the WCDs may organize the WCDs into ProSe groups. In the example illustrated in FIG. 1, the WCDs are organized into four ProSe groups: ProSe group A 171, ProSe group B 172, ProSe group C 173, and ProSe group D 174. Some ProSe groups (e.g., ProSe group D 174) may include a single WCD. In an embodiment, a WCD may belong to multiple ProSe groups. For instance, WCD 102 belongs to both ProSe group A 171 and ProSe group B 172. A ProSe group may act as a private IP network that allows its members to communicate securely. Each group may be organized along a different application, a different data type, a different user preference, or any other factor. As an example, WCD 101 and WCD 102 may be organized into ProSe group A 171 to share data for a voice-based application, while WCD 102, WCD 103, and WCD 106 may be organized into ProSe group B 172 to share data for a messaging application.

A ProSe group may be formed by a group owner. For instance, an application on WCD 101 may form ProSe group A 171 by generating encryption and decryption keys for the group and by causing WCD 101 to broadcast the existence of the group. The group may be formed with or without user input. In the example of FIG. 1, an application running on WCD 102 may send a request to join ProSe group A 171 to the group owner (i.e., WCD 101). In this example, the same application running on WCD 101 may accept the request by sending the encryption and decryption keys for the group to WCD 102. Each ProSe group may have its own set of one or more encryption parameters. For instance, WCD 102 may use a first encryption parameter to communicate with WCD 101 (part of ProSe group A 171), and may use a different encryption parameter to communicate with WCD 106 and WCD 103 (part of ProSe group B 172). Group management is described in more detail in 3GPP TR 23.703 versions v0.45.1 and v0.5.0.

As described in more detail below, a WCD may be configured to screen the packets that are broadcasted by other WCDs. For instance, WCDs 101 to 107 may each be broadcasting wireless packets (e.g., data packets) as part of a proximity-based service. If the WCDs are all in proximity (e.g., within each other's broadcast range), a WCD may receive wireless packets that do not concern the WCD. WCD 104, for example, may receive wireless packets broadcasted by WCDs 101, 102, 106, and 107, even though such communication does not concern WCD 104 and is thus of no interest to the WCD.

Figure 2:
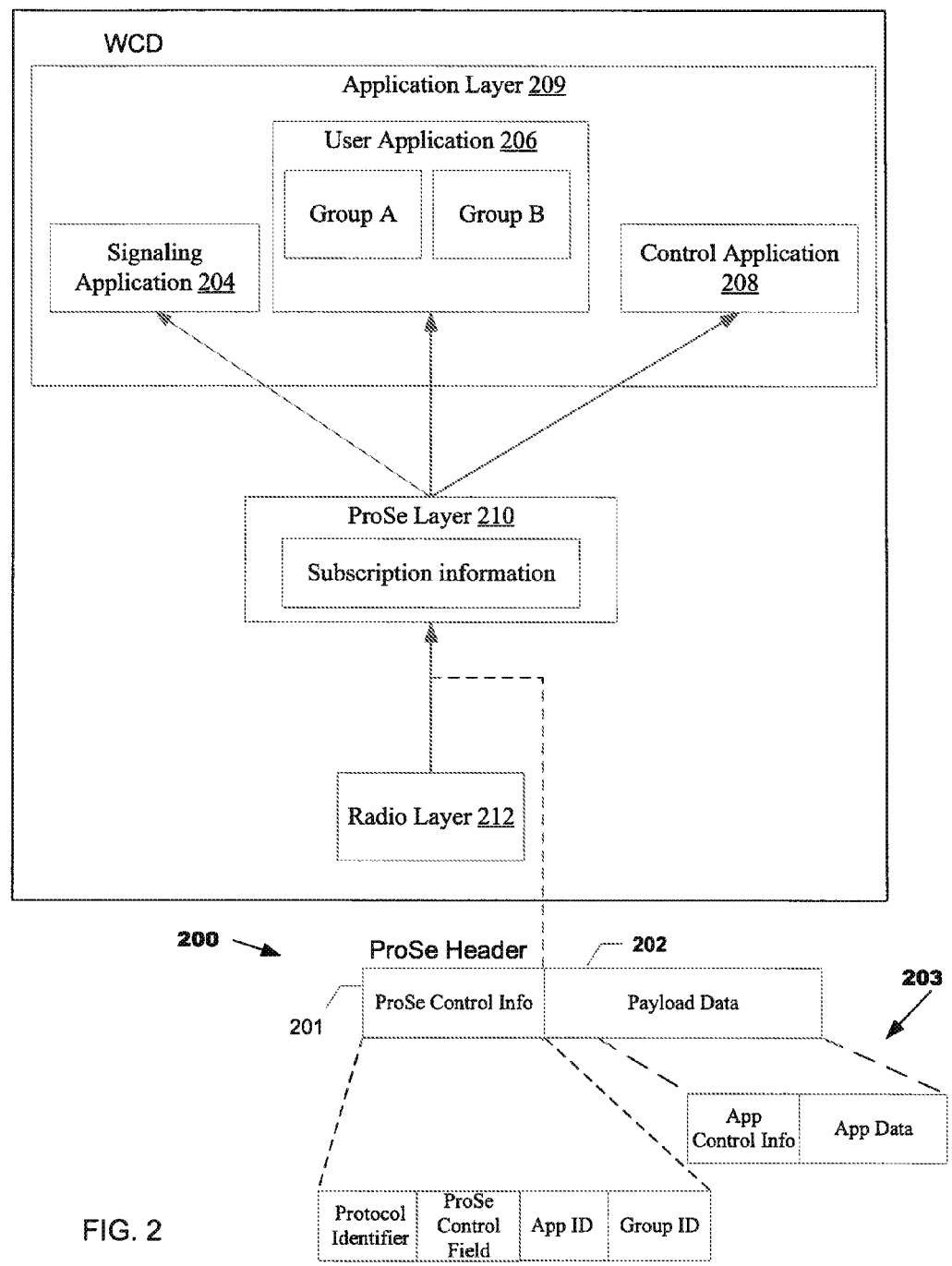
FIG. 2 illustrates various protocol layers for facilitating communication in a ProSe group, according to an aspect of the present disclosure.

The screening and routing of a received wireless packet may be performed in a lower protocol layer, and may be based on values in a packet header of the wireless packet. FIG. 2 illustrates example protocol layers in a WCD for screening and routing wireless packets, and illustrates an example packet structure that facilitates the screening and routing. In the illustrated example, the WCD performs D2D communication via an application layer 209, a ProSe layer 210, and a radio layer 212.

The radio layer 212 may include one or more layers at which a wireless packet is constructed from received signals. In an embodiment, it may include a L1 layer (e.g., physical layer) and a L2 layer (e.g., media access control (MAC) layer and radio link control (RLC) layer).

The ProSe layer 210 screens received wireless packets for relevant packets and routes relevant packets to an appropriate application in the application layer. The ProSe layer 210 may screen the received wireless packets based on subscription information, which may be configured by the application layer. In an embodiment, the subscription information identifies at least one of: (1) application IDs that identify applications (e.g., ProSe applications) running on the WCD, and (2) group IDs that identify groups, such as proximity-enabled service (ProSe) groups, to which the WCD or identified applications belong.

The application layer 209 may include one or more layers in which an application receives and processes wireless packets. The applications may include at least one of a user application 206, a control application 208, and a signaling application 204. An application in the application layer may perform group management for one or more ProSe groups. For example, the application may determine that it needs to join a preexisting ProSe group or to form a new ProSe group in order to communicate with the same application on other WCDs. The application on the WCD may subscribe to wireless packets from the WCD's ProSe groups by registering its application ID and identifiers of the ProSe groups with the ProSe layer 210. The application may perform the encryption and decryption of wireless packets based on parameters corresponding to a ProSe group to which the packet is addressed. In the illustrated example of FIG. 2, the user application 206 may select between a decryption key for ProSe group A 171 and a decryption key for ProSe group B 172 based on whether a received wireless packet is addressed to ProSe group A 171 or whether the packet is addressed to ProSe group B 172.

The protocol layers of FIG. 2 are presented for illustration purposes, and a protocol stack for communication between WCDs may include fewer protocol layers, more protocol layers (e.g., an IP layer), a different set of protocol layers, or any combination thereof.

Wireless packets may be formatted by the transmitting WCD (e.g., by the ProSe layer of the transmitting WCD) to facilitate the packet screening and routing. FIG. 2 illustrates a wireless packet 200 that includes a ProSe header 201 and payload data 202. The ProSe header 201 includes ProSe control information used for screening and routing wireless packets. More particularly, in some embodiments, the ProSe control information includes a protocol identifier, a ProSe control field, an application ID, and a group ID. In some embodiments, the group ID is referred to as a ProSe Layer-2 Group ID. The protocol identifier may identify a protocol version of a protocol stack (or protocol layer) that generated the wireless packet 200. The ProSe control field may include routing control information.

As a more specific example, the protocol identifier may be a 3-bit field, while the ProSe control field may be an 8-bit field. Table 1 below illustrates example values of the ProSe control field. The ProSe layer may route a wireless packet based on at least one of the ProSe control field and the application ID.

TABLE 1

Example ProSe control fields

| ProSe Control Field | Meaning | Description |
|---|---|---|
| 1 | User data for Group Communication | User data for group communication. Deliver to the Application indicated in the APP ID field. |

TABLE 1-continued

Example ProSe control fields

| ProSe Control Field | Meaning | Description |
|---|---|---|
| 2 | User data for One-to-One Communication | User data for one to one communication. Deliver to an application much in the same way as for group communication. |
| 3 | General control signalling | Send to a general control application. |
| 4 | Relay control | Control message for setting up WCD to network relay. |
| 5 | Relay user data to Network | User data to send to a relay node for forwarding on a relay channel to network. |
| 6 | Relay user data to WCD | User data to send to a relay node for forwarding on a relay channel to other WCD. |
| 7 | Discovery control | Control information for performing discovery function (i.e. for WCDs in proximity to discover each other). Deliver to a discovery control function in the WCD. |
| 8 | Mobility Management | Control information for managing Mobility related functions. Deliver to a Mobility Management function in the WCD. |
| 9 | Session Management | Control information for managing Session related functions. Deliver to a Session Management function in the WCD to, e.g., set up bearers or connections (e.g., PDN connections) between WCDs. |
| 10 | Security Management | Control information for managing Security related functions. Deliver to a Security function in the WCD for, e.g., key exchange, managing security tunnels, mutual authentication between WCDs, etc. |
| 11 | ProSe Management | Control information for managing ProSe related functions. Deliver to a ProSe Management function in the WCD for, e.g., ProSe authorization. |
| 12 | D2D Radio Management | Control information for managing D2D Radio related functions. Deliver to a D2D Radio Management function in the WCD for, e.g., D2D authorization for radio frequency, range classes power level settings, etc. |

The application ID illustrated above may identify an application that generated the application layer data 203 contained in the payload portion 202 of wireless packet 200, while the group ID may identify a ProSe group that the packet is intended for. In an embodiment, the group ID may not be guaranteed to be unique, in that two ProSe groups in an area may have the same group ID. In an embodiment, the application ID may be guaranteed to be unique. For instance, all applications that can be run on WCDs may have to be registered with a registration organization, which issues a unique ID to each of the applications.

The application layer data 203 of wireless packet 200 may include application control information and application data. In an embodiment, while the group ID may identify the ProSe group to which a wireless packet is addressed, the application control information may identify the specific group member from which the wireless packet originated. As an example, the application control information may include a source IP address. In an embodiment, the application control information may be used by an application to select an encryption or decryption key for the received wireless packet.

Advantages

Advantages provided by this disclosure include the ability to reduce the burden that multiple broadcasted wireless packets may impose on applications running on a WCD. For example, if a lower protocol layer determines that a received wireless packet is of no interest to the WCD, it can avoid the processing overhead of passing the wireless packet to the application layer, and the application layer can avoid the burden of having to attempt to decrypt the wireless packet. The advantages further include the ability for one of multiple applications running on a WCD to communicate with the same application running on another WCD. The screening and routing of wireless packets thus provides an efficient way of managing communication among a plurality of applications running on a plurality of WCDs.

Exemplary Methods

Figure 3:
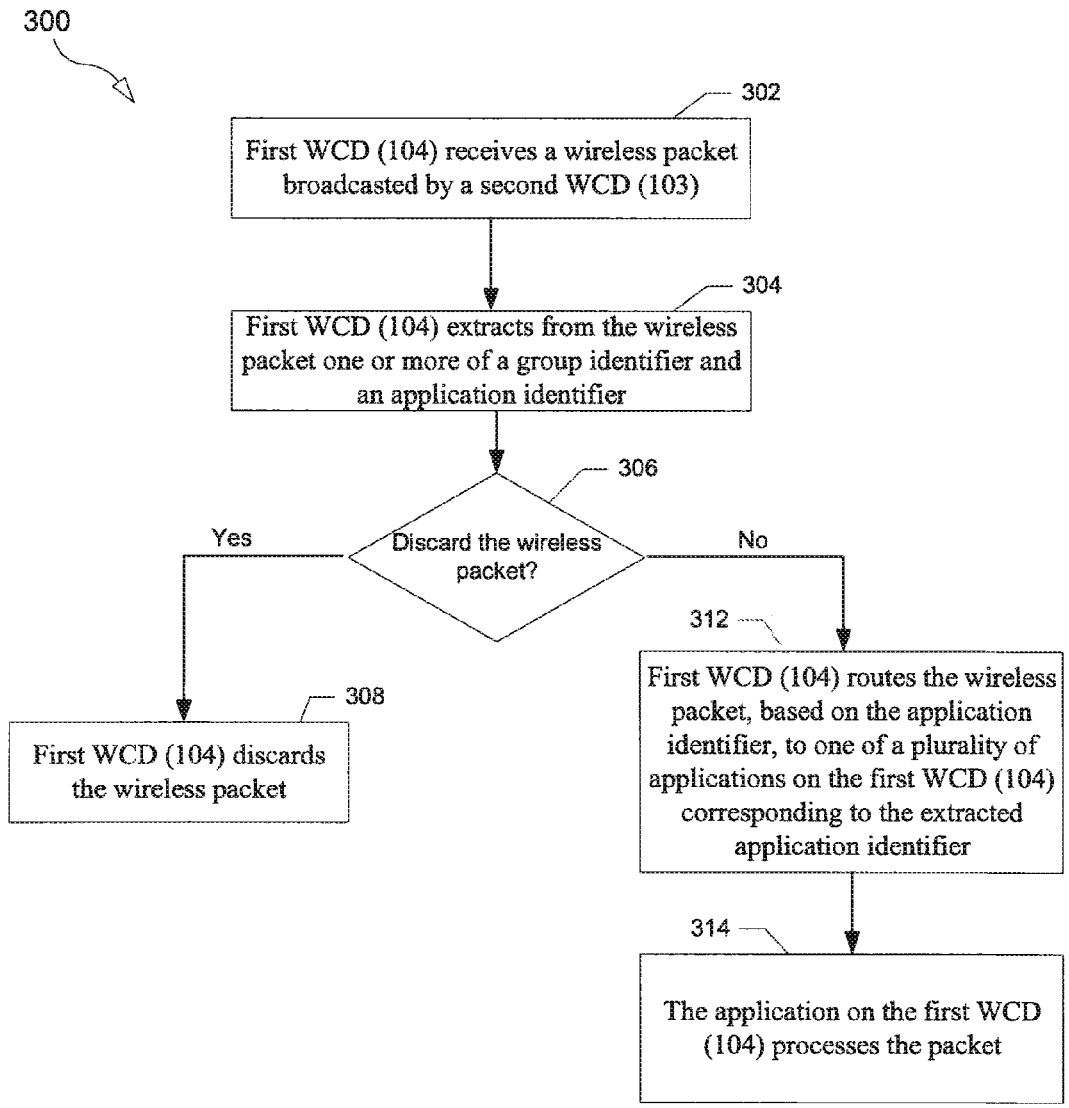
FIG. 3 illustrates a flow diagram according to an embodiment of the present disclosure.

FIG. 3 is a flow diagram illustrating a process 300 in which a WCD or other WCD receives wireless packets (such as a wireless packet of the form shown in FIG. 2) broadcasted by other WCDs, screens the received wireless packets to determine which wireless packets are of interest to the WCD, and routes the wireless packets that are of interest to the WCD to an appropriate application that is running or configured to be run on the WCD.

In an embodiment, the process 300 begins in step 302, where a first WCD (such as WCD 104) receives a wireless packet transmitted by a second WCD (e.g., such as WCD 103). In some cases, the wireless packet may be intended for a particular application that corresponds to a particular ProSe group. Thus, in some instances, the broadcasted packet may have no destination WCD address (e.g., no MAC address that is specific to a particular WCD and no IP address that is specific to any WCD). In an embodiment, step 302 may be performed in a radio layer (e.g., radio layer 212) of the first WCD.

In step 304, the first WCD may extract one or more of a group identifier (e.g., a group ID) and an application identifier (e.g., an application ID) from the received wireless packet. The group ID and/or the application ID may be extracted from a packet header of the wireless packet. In some cases, the packet header is unencrypted. In an embodiment, steps 304 through 312 may be performed in a ProSe layer (e.g., ProSe layer 210) of the first WCD. For instance, the wireless packet may be received by a radio layer (e.g., the radio layer may receive a packet that contains the wireless packet), which may process and dispatch the wireless packet to the ProSe layer.

In an embodiment, the first WCD may extract the application ID only if it determines in step 306 that the group ID matches the first WCD's subscription information (e.g., information that identifies a set of groups to which the WCD belongs), as discussed below.

In step 306, the first WCD determines whether to discard the packet (e.g., whether a header of the received packet fails to match subscription information of the first WCD). For instance, the first WCD may determine whether one or both of the extracted group ID and the application ID matches the subscription information. For example, the subscription information may include a set of tuples where each tuple includes a group ID and an application ID, and the first WCD may be configured to discard a packet if the tuple of group ID and application ID contained in the ProSe header of the wireless packet does not match any of the tuples of group ID and application ID included in the subscription information. The subscription information may identify some or all ProSe groups to which the first WCD belongs and/or applications running on the first WCD that are engaging in D2D communication with other WCDs. In an embodiment, the subscription information may have been set by one or more applications of the first WCD after they joined or formed a new ProSe group. The determination may reflect an assumption that wireless packets directed toward a ProSe group of the first WCD is of interest to the first WCD, while wireless packets that are not directed toward a ProSe group of the first WCD is of no interest to the first WCD.

In step 308, the first WCD discards (e.g., ignores) the wireless packet in response to a determination that the packet should be discarded in step 306, indicted with "yes" in FIG. 3, (e.g., in response to a determination that the extracted group ID does not match any group ID included in subscription information). For example, the ProSe layer of the first WCD may delete the wireless packet or simply fail to pass the wireless packet to a higher protocol layer (e.g., the application layer).

In step 312, the first WCD routes the wireless packet, based on the application ID, to one of a plurality of applications on the first WCD corresponding to the extracted application identifier (or routes it to another protocol layer for further processing). The packet may be routed to an application currently running on the first WCD or an application stored on the first WCD. In the latter case, the wireless packet may be stored in an area allocated for the application. When the application starts running on the first WCD, it accesses the wireless packet from the storage area. In an embodiment, the group ID is routed to the application as part of the wireless packet, while the application ID is not routed. Step 312 is in response to a determination that the packet should not be discarded in step 306, indicated with "no" in FIG. 3.

In step 314, after a wireless packet (or portion thereof) has been routed to an application, the application on the first WCD processes the packet (e.g., the application process application data contained in the packet). In some embodiments the processing includes determining a decryption key based on the group ID of the packet and then decrypting the application data using the determined decryption key.

Figure 4:
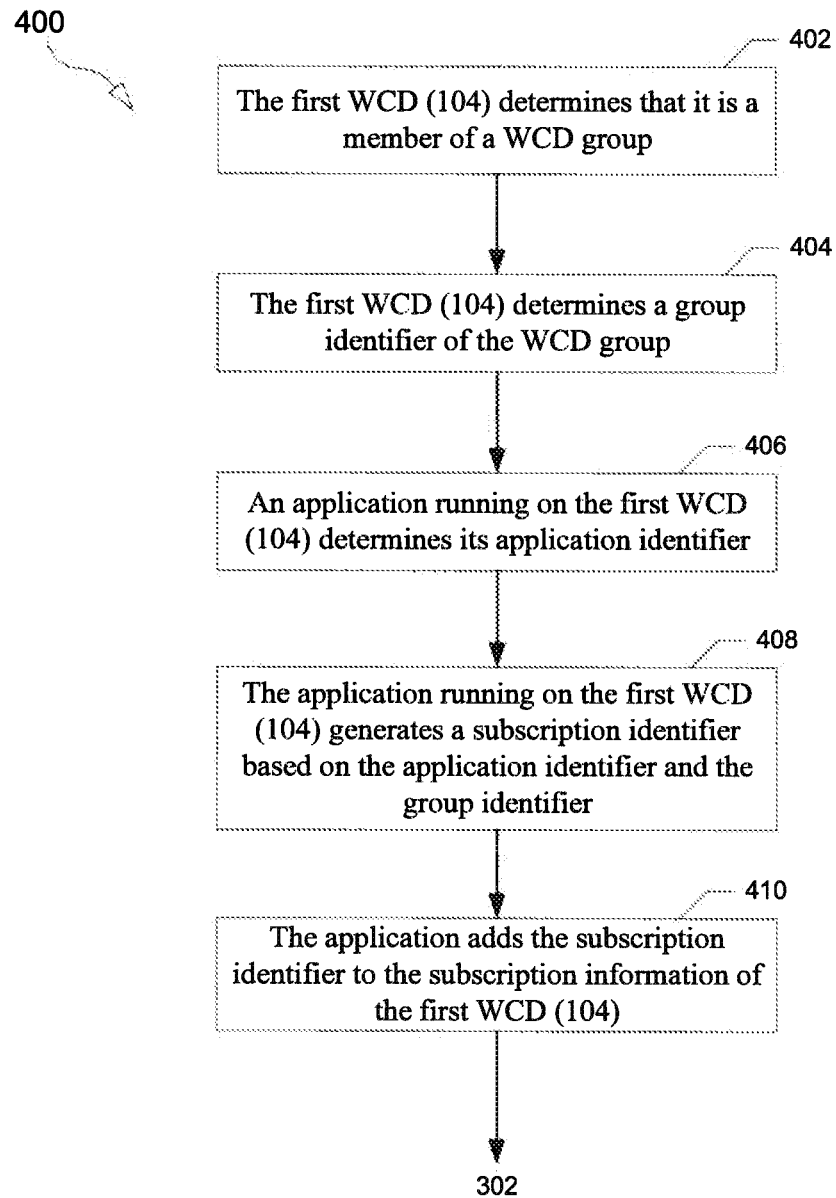
FIG. 4 illustrates a flow diagram according to an embodiment of the present disclosure.

FIG. 4 is a flow diagram illustrating an example process 400 in which an application configures a lower protocol layer with subscription information, which may then be used for screening wireless packets. In an embodiment, process 400 begins with step 402, in which an application running on the first WCD 104 determines that it has become a member of a WCD group (e.g., WCD group 172), which may be a ProSe group. The application may make this determination, for example, after forming a new ProSe group (e.g., after becoming a group owner) or after it receives permission to join another ProSe group.

In step 404, the application may determine a group ID of the WCD group 172. In an embodiment, the group ID may be provided by the group owner. In some instances, the group ID may be broadcasted by the group owner when it is advertising the presence of its ProSe group.

In step 406, the application running on the first WCD 104 may determine its application ID. The application ID may have been provided by a registration organization. In some cases, the application ID may have been downloaded to the first WCD when the application itself was downloaded. As discussed above, the group ID may not be unique in some cases, while the application ID may be unique.

In step 408, the application running on the first WCD 104 may generate a subscription identifier based on the application ID and the group ID. The subscription identifier identifies an application and a ProSe group that is relevant to the first WCD 104. That is, for example, the subscription identifier may be tuple consisting of the group ID and the application ID. A wireless packet can be compared against the subscription identifier to determine whether the wireless packet is relevant to the first WCD, as described above. In an embodiment, the subscription identifier may be a concatenation of the application ID and the group ID.

In step 410, the application may add the subscription identifier to the subscription information of the first WCD 104. The subscription information may include a plurality of subscription identifiers that each identifies an application engaged in D2D communication and a ProSe group involved in the communication. Referring to the illustration in FIG. 2, the subscription information may include any number of subscription identifiers, such as a first and a second subscription identifier. The first subscription identifier may be based on an application ID for user application 206 and a group ID for group A. The second subscription identifier may be based on an application ID for user application 206 and a group ID for group B. The subscription information may be used by the ProSe layer (e.g., ProSe layer 210) in screening received wireless packets.

Figure 5A:
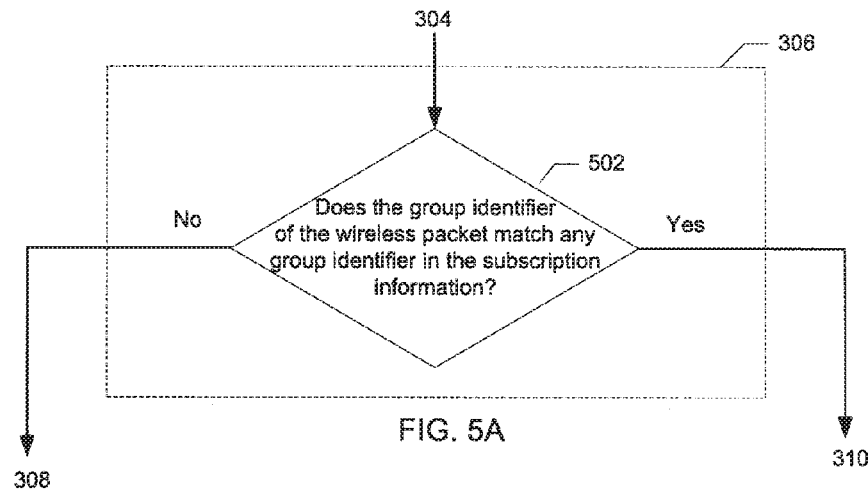
FIGS. 5A and 5B illustrate a flow diagram according to an embodiment of the present disclosure.
Figure 5B:
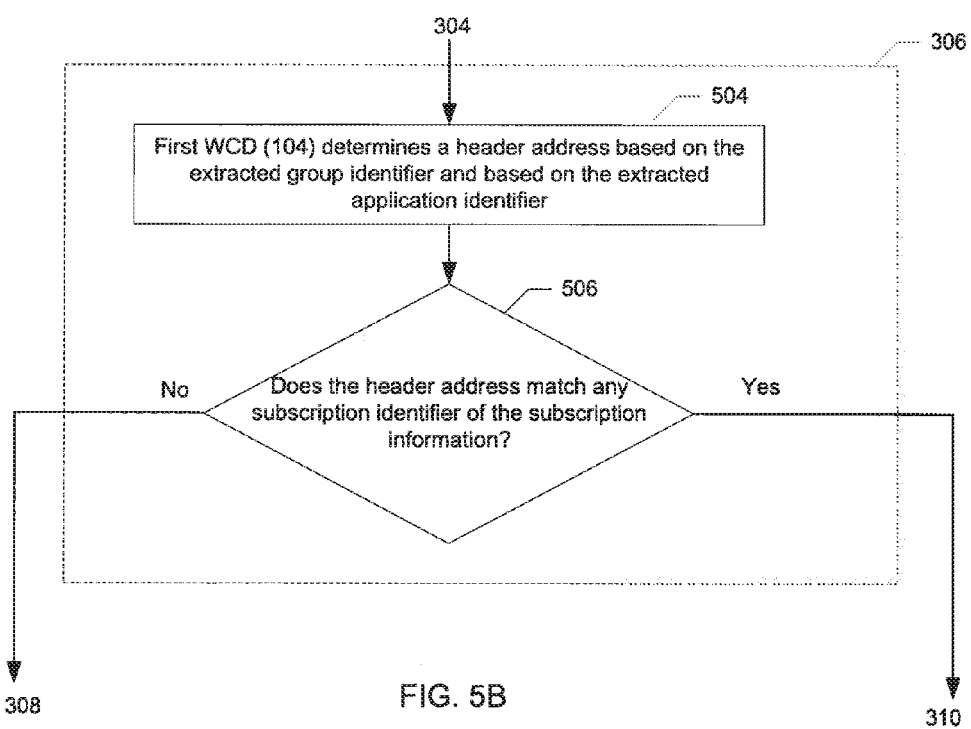

FIGS. 5A-5B are flow diagrams that illustrate how, in some embodiments, the first WCD determines, in step 306, whether to discard a received wireless packet. In the example of FIG. 5A, the first WCD makes the determination based on the group ID. More specifically, in step 502, the first WCD determines whether the group ID extracted from the wireless packet matches any group IDs of the first WCD's subscription information. For instance, the first WCD may compare the extracted group ID against a group ID of each subscription identifier of the subscription information until a match is found. If the group identifier does not match any group identifier in the subscription information, indicated with "no" in FIG. 5a, step 308 in FIG. 3 is executed. If the group identifier does match any group identifier in the subscription information, indicated with "yes" in FIG. 5a, step 310 in FIG. 3 is executed.

Because the group ID may not be unique, the application ID may also be used in screening received wireless packets. FIG. 5B illustrates such a process. In step 504, the first WCD may determine a header address based on the extracted group ID and based on the extracted application ID. In an embodiment, the header address may be a concatenation of the application ID and the group ID. In step 506, the first WCD may determine whether the header address matches any subscription identifier of the subscription information. If the header address does not match any subscription identifier of the subscription information, indicated with "no" in FIG. 5b, step 308 is executed. If the header address does match any subscription identifier of the subscription information, indicted with "yes" in FIG. 5b, step 310 is executed.

As a more specific example of steps 504 and 506, WCD 104 in FIG. 1 is in ProSe group B 172, and may receive a wireless packet that was broadcasted from WCD 101, which is in ProSe group A 171. In the example, ProSe group A 171 and ProSe group B 172 may happen to have the same group ID. However, ProSe group A 171 is providing a proximity-based service based on a messaging application, while ProSe group B 172 is providing a proximity-based service based on a voice application. Thus, WCD 104 is running a voice application, which generates a subscription identifier that concatenates an application ID of the voice application and a group ID of ProSe group B 172. In step 504, WCD 104 obtains a header address from the wireless packet transmitted by WCD 101. The header address may be, for instance, a concatenation of an application ID of the messaging application and a group ID of ProSe group A 171. Even though the group IDs of the two groups are the same, the application IDs of the two applications are different. Thus, in step 506, the WCD 104 determines that the header address does not match any subscription identifier maintained by WCD 104. WCD 104 may thus discard (e.g., ignore) the received wireless packet transmitted from WCD 101.

Figure 6:
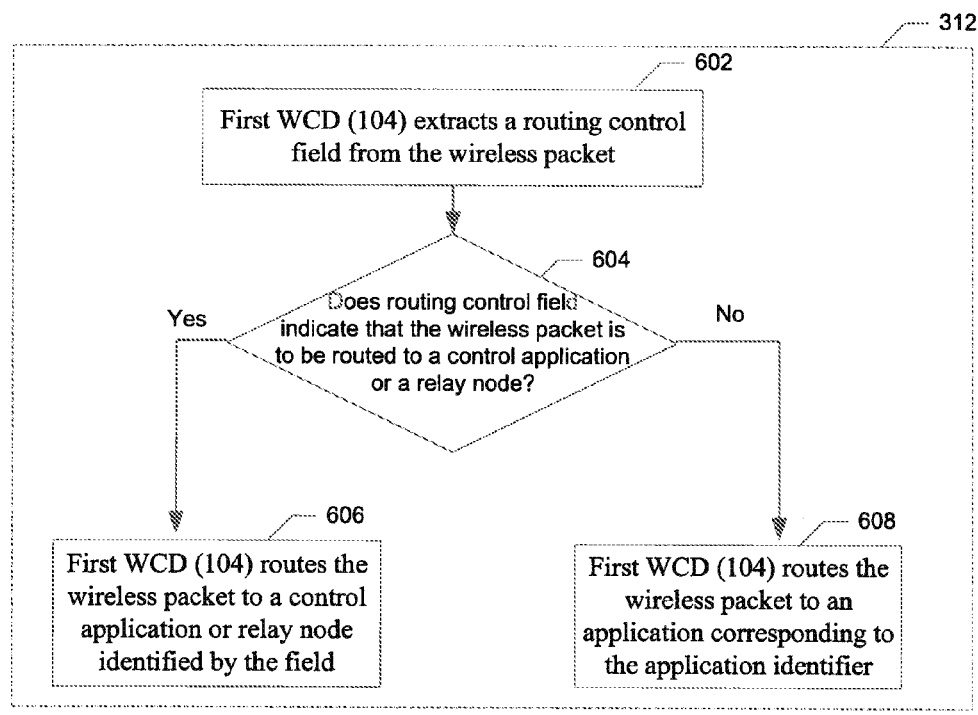
FIG. 6 illustrates a flow diagram according to an embodiment of the present disclosure.

FIG. 6 is a flow diagram that illustrates how the first WCD 104 routes a wireless packet in step 312 of FIG. 3. The routing may be based on a routing control field (e.g., ProSe control field), on an application ID, or any combination thereof. In an embodiment, the step begins in step 602, in which the first WCD 104 extracts a routing control field from the wireless packet.

In step 604, the first WCD 104 determines whether the routing control field indicates that the wireless packet is to be routed to a control application or a relay node identified by the routing control field. For instance, referring to Table 1, a value of 3 in the ProSe control field indicates that the packet should be routed to a general control application, while a value of 5 indicates that the packet should be routed to a relay node. During routing, this indication from the routing control field may take precedence over the application ID. In such a situation, indicated with "yes" in FIG. 6, in step 606, the first WCD 104 routes the wireless packet to the control application or relay node identified in the routing control field.

If the routing control field does not indicate that the wireless packet is to be routed to a control application or relay node identified by the routing control field, indicated with "no" in FIG. 6, the first WCD may instead route the packet based primarily on the application ID. Thus, in step 608, the first WCD routes the wireless packet to an application corresponding to the extracted application ID. As an example, referring again to Table 1, a value of 1 in the ProSe control field indicates that the routing should be based on the application ID, rather than based on any control application or relay node identified in the ProSe control field.

Figure 7:
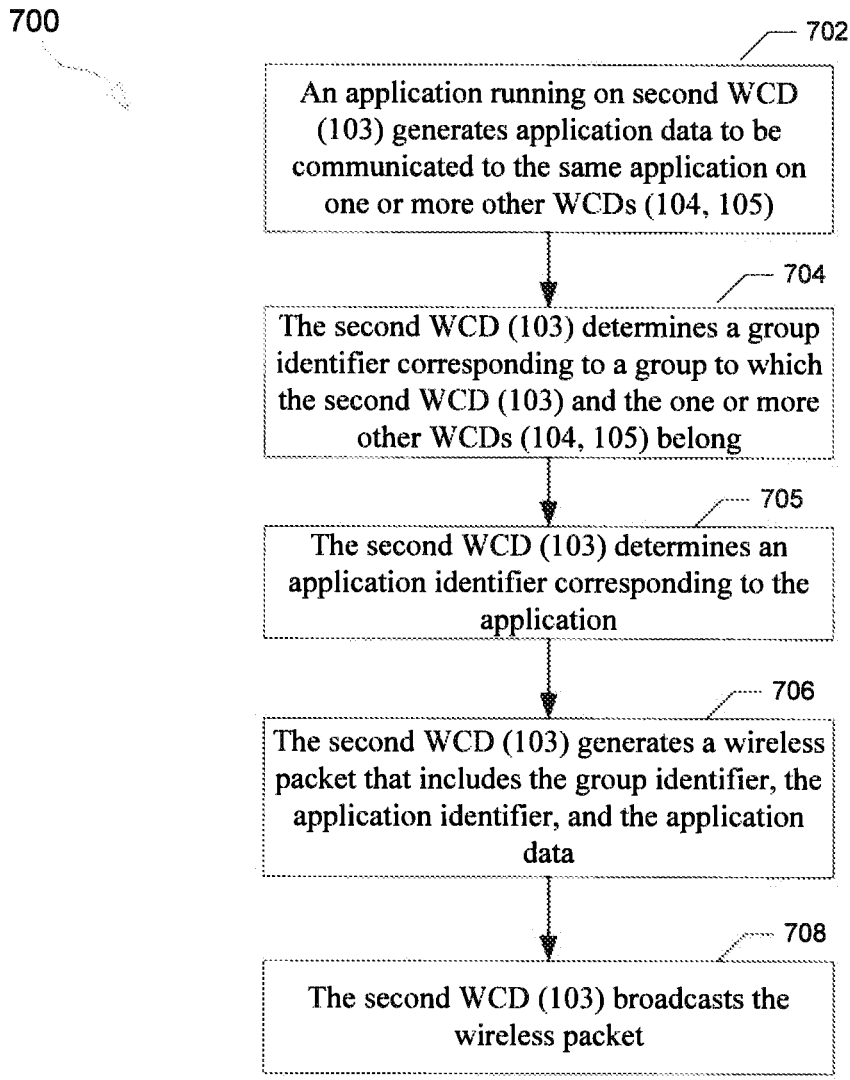
FIG. 7 illustrates a flow diagram according to an embodiment of the present disclosure.

FIG. 7 is a flow diagram of a process 700 that illustrates how a wireless packet of the present disclosure is broadcasted. In an embodiment, the process begins in step 702, in which an application running on a second WCD (e.g., WCD 103) generates application data to be communicated to the same application on one or more other WCDs (e.g., WCDs 104 and 105). The second WCD and the one or more other WCDs belong to a group (e.g., ProSe group B 172) used for D2D communication. For instance, a voice application conducting D2D communication with other WCDs generates application data.

In step 704, the second WCD may determine a group ID corresponding to the group to which the second WCD and the one or more other WCDs belong. For example, the voice application may have joined a preexisting ProSe group or formed a new ProSe group to conduct the D2D communication. The group ID for the ProSe group may be provided to the voice application by the group owner. In some cases, if the voice application formed the ProSe group, it may have selected the group ID.

In step 705, the second WCD determines an application identifier corresponding to the application (e.g., corresponding to the voice application). The application identifier may have been issued by a registration organization or application directory.

In step 706, the second WCD may generate a wireless packet that includes the application ID and the group ID (e.g., in a packet header) and the application data. In an embodiment, this step may be performed in an application layer of the second WCD, such as by the voice application. In an embodiment, this step may be performed in a lower protocol layer, such as a ProSe layer or radio layer.

In step 708, the second WCD may wirelessly broadcast the packet. In an embodiment, the step may be performed in the radio layer. In an embodiment, any of steps 702 through 708 may be performed without a discovery phase. That is, the second WCD may be broadcasting a packet for its ProSe group without knowing whether any members of that group are in proximity of the WCD. In an embodiment, the receiving WCD, e.g. the first WCD, may, however, send an acknowledgment of the broadcasted packet.

Exemplary WCD

Figure 8:
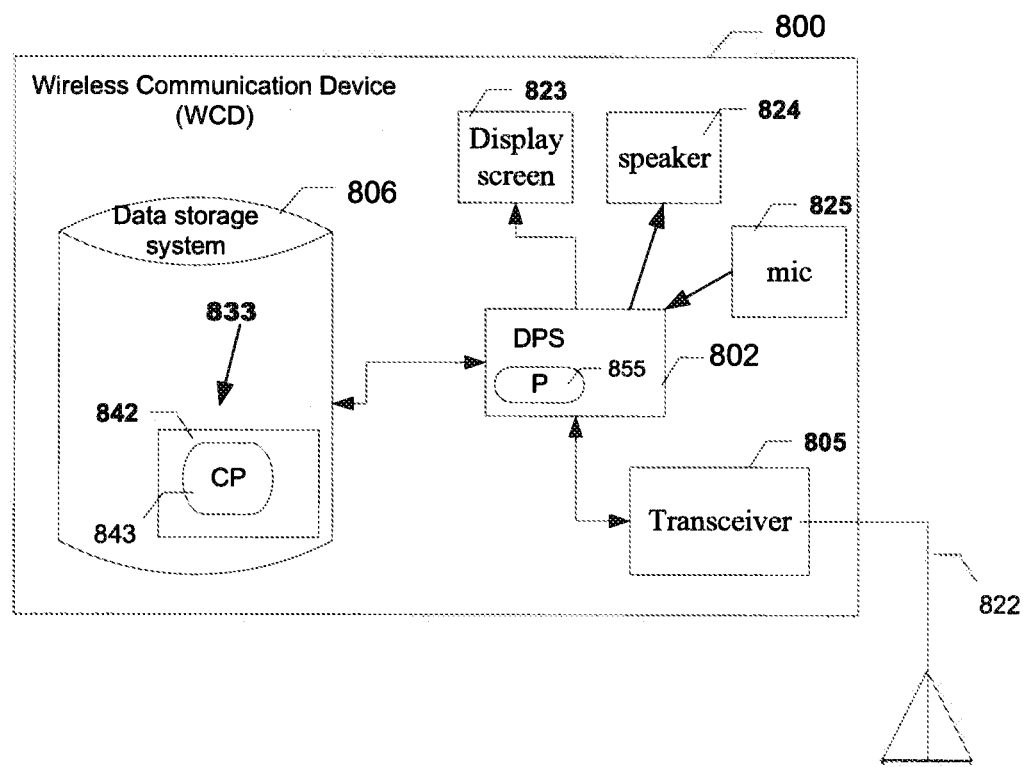
FIG. 8 illustrates a WCD according to one embodiment of the present disclosure

FIG. 8 illustrates a block diagram of an example WCD 800. The example WCD 800 may be an example of a first WCD 104 or a second WCD 103. As shown in FIG. 8, WCD 800 includes: a data processing system (DPS) 802, which may include one or more processors (P) 855 (e.g., microprocessors) and/or one or more circuits, such as an application specific integrated circuit (ASIC), Field-programmable gate arrays (FPGAs), etc.; a transceiver 805, connected to an antenna 822, for receiving messages from, and transmitting messages to, various access points; a data storage system 806, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 802 includes a processor 855 (e.g., a microprocessor), a computer program product 833 may be provided, which computer program product includes: a computer program (CP) 843, which includes a set of computer instructions, stored on a computer readable medium 842 of data storage system 806, such as, but not limited, to magnetic media (e.g., a hard disk), optical media (e.g., a DVD), memory devices (e.g., random access memory), etc. In some embodiments, computer program 843 is configured such that, when executed by data processing system 802, computer program 843 causes the data processing system 802 to perform steps described herein (e.g., steps shown in FIGS. 3-7).

In some embodiments, WCD 800 is configured to perform steps described above without the need for code 843. For example, data processing system 802 may consist merely of specialized hardware, such as one or more application-specific integrated circuits (ASICs). Hence, the features of the present embodiments described above may be implemented in hardware and/or software. For example, in some embodiments, the functional components of WCD 800 described above may be implemented by data processing system 802 executing program code 843, by data processing system 802 operating independent of any computer program code 843, or by any suitable combination of hardware and/or software.

In a second embodiment, WCD 800 further includes: 1) a display screen 823 coupled to the data processing system 802 that enables the data processing system 802 to display information to a user of WCD 800; 2) a speaker 824 coupled to the data processing system 802 that enables the data processing system 802 to output audio to the user of WCD 800; and 3) a microphone 825 coupled to the data processing system 802 that enables the data processing system 802 to receive audio from the user.

In some embodiments, a first computer program may comprise instructions which, when executed on at least one processor, cause the at least one processor to carry out the method as described in relation to FIGS. 3-6 above. A first carrier may comprise the first computer program. The first carrier may be one of an electronic signal, optical signal, radio signal or computer readable storage medium.

In some embodiments, a second computer program may comprise instructions which, when executed on at least one processor, cause the at least one processor to carry out the method as described in relation to FIGS. 3 and 7 above. A second carrier may comprise the second computer program. The second carrier may one of an electronic signal, optical signal, radio signal or computer readable storage medium.

The present disclosure is applicable to a communication system compliant with the 3rd Generation Partnership Project (3GPP), specified Long Term Evolution (LTE), standard specification, as well as other communication systems, such as the Universal Mobile Telecommunications System (UMTS). The specific embodiments should therefore be considered exemplary rather than limiting the scope of the disclosure, which rather is to be defined by the following claims.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for processing wireless packets received at a first wireless communication device (WCD), the method comprising:
   the first WCD receiving a wireless packet broadcasted by a second WCD, the wireless packet having application data that was obtained by an application running on the second WCD and intended for a corresponding application running on one or more other WCDs, and further having one or more of i) a group identifier that identifies a group to which the second WCD belongs and ii) an application identifier that identifies an application which generated at least part of the wireless packet;
   the first WCD extracting from the wireless packet one or more of the group identifier and the application identifier;
   the first WCD determining whether to discard the wireless packet having the application data based on the one or more of the group identifier and the application identifier extracted from the wireless packet.

2. The method of claim 1, wherein the first WCD stores subscription information that identifies at least one of i) an application stored on the first WCD and configured to communicate with other WCDs, and ii) a group of WCDs to which the first WCD belongs, and wherein determining whether to discard the wireless packet comprises determining whether the stored subscription information matches at least one of the group identifier and the application identifier.

3. The method of claim 2, wherein the first WCD extracts the group identifier and the application identifier, and wherein determining whether to discard the wireless packet comprises determining whether the stored subscription information matches the group identifier and the application identifier.

4. The method of claim 1, wherein the group identifier is shared by at least two different groups of WCDs and the application identifier is unique among all applications that are configured run on the first WCD.

5. The method of claim 1, wherein the first WCD determines whether to discard the wireless packet based on both the group identifier and the application identifier.

6. A method for processing wireless packets received at a first wireless communication device (WCD), the method comprising:
the first WCD receiving a wireless packet broadcasted by a second WCD, the wireless packet having one or more of i) a group identifier that identifies a group to which the second WCD belongs and ii) an application identifier that identifies an application which generated at least part of the wireless packet;
the first WCD extracting from the wireless packet one or more of the group identifier and the application identifier; and
the first WCD determining whether to discard the wireless packet based on the one or more of the group identifier and the application identifier extracted from the wireless packet, wherein a plurality of applications are stored on the first WCD, wherein the first WCD extracts the application identifier from the wireless packet, and wherein the method further comprises the first WCD routing the wireless packet to one of the plurality of applications corresponding to the extracted application identifier in response to the first WCD determining not to discard the wireless packet.

7. The method of claim 6, wherein the wireless packet further includes a routing control field that indicates whether the wireless packet is to be routed to at least one of: i) the application corresponding to the application identifier, ii) a control application, and iii) a relay node that relays the wireless packet to a base station, wherein the first WCD extracts the routing control field and the routing is based on the routing control field and the application identifier.

8. A method for processing wireless packets received at a first wireless communication device (WCD), the method comprising:
the first WCD receiving a wireless packet broadcasted by a second WCD, the wireless packet having one or more of i) a group identifier that identifies a group to which the second WCD belongs and ii) an application identifier that identifies an application which generated at least part of the wireless packet;
the first WCD extracting from the wireless packet one or more of the group identifier and the application identifier; and
the first WCD determining whether to discard the wireless packet based on the one or more of the group identifier and the application identifier extracted from the wireless packet, wherein at least a portion of the wireless packet is encrypted, wherein the first WCD extracts the group identifier, and wherein the method further comprises the first WCD decrypting the encrypted portion of the wireless packet based on the extracted group identifier in response to the first WCD determining not to discard the wireless packet.

9. The method of claim 8, wherein decrypting the encrypted portion comprises determining a decryption key based on the group identifier.

10. A method for broadcasting wireless packets by a wireless communication device (WCD) comprising:
an application running on the WCD generating application data to be communicated to a corresponding application running on one or more other WCDs, wherein the WCD and the one or more other WCDs belong to a group used for device-to-device communication;
the WCD determining a group identifier for identifying the group;
the WCD determining an application identifier corresponding to the application;
the WCD generating a wireless packet that includes the group identifier, the application identifier, and the application data; and
the WCD broadcasting the wireless packet that includes the group identifier, the application identifier, and the application data to be communicated to a corresponding application on one or more other WCDs.

11. The method of claim 10, wherein generating the wireless packet comprises encrypting the application data based on the group identifier.

12. A first wireless communication device (WCD) comprising:
a transceiver configured to receive a wireless packet broadcasted by a second WCD, the wireless packet having application data that was obtained by an application running on the second WCD and intended for a corresponding application running on one or more other WCDs, and further having one or more of i) a group identifier that identifies a group to which the second WCD belongs and ii) an application identifier that identifies an application which generated at least part of the wireless packet; and
one more processors configured to:
extract from the wireless packet one or more of the group identifier and the application identifier, and
determine whether to discard the wireless packet having the application data based on the one or more of the group identifier and the application identifier extracted from the wireless packet.

13. The first WCD of claim 12, further comprising a storage device that stores subscription information that identifies at least one of i) an application stored on the WCD and configured to communicate with other WCDs, and ii) a group of WCDs to which the WCD belongs, wherein the one or more processors are configured to determine whether to discard the wireless packet by determining whether the stored subscription information matches at least one of the group identifier and the application identifier.

14. The first WCD of claim 12, wherein the one or more processors are configured to extract the group identifier and the application identifier and to determine whether to discard the wireless packet by determining whether the stored subscription information matches the group identifier and the application identifier.

15. The first WCD of claim 12, wherein the group identifier is shared by at least two different groups of WCDs and the application identifier is unique among all applications that are configured run on the WCD.

16. A first wireless communication device (WCD) comprising:
a transceiver configured to receive a wireless packet broadcasted by a second WCD, the wireless packet having one or more of i) a group identifier that identifies a group to which the second WCD belongs and ii) an application identifier that identifies an application which generated at least part of the wireless packet; and
one more processors configured to:
extract from the wireless packet one or more of the group identifier and the application identifier, and determine whether to discard the wireless packet based on the one or more of the group identifier and the application identifier extracted from the wireless packet, wherein a plurality of applications are stored on the WCD, and wherein the one or more processors are configured to extract the application identifier from the wireless packet and to route the wireless packet to one of the plurality of applications corresponding to the extracted application identifier in response to a determination not to discard the wireless packet.

17. The first WCD of claim 16, wherein the wireless packet further includes a routing control field that indicates whether the wireless packet is to be routed to at least one of: i) the application corresponding to the application identifier, ii) a control application, and iii) a relay node that relays the wireless packet to a base station, wherein the one or more processors are configured to extract the routing control field and to route the wireless packet based on the routing control field and the application identifier.

18. A first wireless communication device (WCD) comprising:
    a transceiver configured to receive a wireless packet broadcasted by a second WCD, the wireless packet having one or more of i) a group identifier that identifies a group to which the second WCD belongs and ii) an application identifier that identifies an application which generated at least part of the wireless packet; and
    one more processors configured to:
        extract from the wireless packet one or more of the group identifier and the application identifier, and
        determine whether to discard the wireless packet based on the one or more of the group identifier and the application identifier extracted from the wireless packet,
    wherein at least a portion of the wireless packet is encrypted, wherein the one or more processors are configured to extract the group identifier and to decrypt the encrypted portion of the wireless packet based on the extracted group identifier in response to the determination not to discard the wireless packet.

19. The first WCD of claim 18, wherein the one or more processors are configured to decrypt the encrypted portion by determining a decryption key based on the group identifier.

20. A wireless communication device (WCD) comprising:
    one or more processors configured to:
        run an application on the WCD to generate application data to be communicated to a corresponding application on one or more other WCDs, wherein the WCD and the one or more other WCDs belong to a group used for device-to-device communication,
        determine a group identifier for identifying the group,
        determine an application identifier corresponding to the application, and
        generate a wireless packet that includes the group identifier, the application identifier, and the application data; and
    a transceiver configured to transmit the wireless packet that includes the group identifier, the application identifier, and the application data to be communicated to the same application on one or more other WCDs.

21. The second WCD of claim 20, wherein the one or more processors are configured to generate the wireless packet by encrypting the application data based on the group identifier.

22. A computer program product comprising a non-transitory computer readable medium storing instructions for configuring a first wireless communication device (WCD) to:
    process a received wireless packet that was broadcasted by a second WCD, the wireless packet having application data that was obtained by an application running on the second WCD and intended for a corresponding application running on one or more other WCDs, and further having one or more of i) a group identifier that identifies a group to which the second WCD belongs and ii) an application identifier that identifies an application which generated at least part of the wireless packet;
    extract from the wireless packet one or more of the group identifier and the application identifier;
    determine whether to discard the wireless packet having the application data based on the one or more of the group identifier and the application identifier extracted from the wireless packet.

23. A computer program product comprising a non-transitory computer readable medium storing instructions for configuring a wireless communication device (WCD) to:
    obtain from an application running on the WCD application data to be communicated to a corresponding application running on one or more other WCDs, wherein the WCD and the one or more other WCDs belong to a group used for device-to-device communication;
    determine a group identifier for identifying the group;
    determine an application identifier corresponding to the application;
    generate a wireless packet that includes the group identifier, the application identifier, and the application data; and
    broadcast the wireless packet that includes the group identifier, the application identifier, and the application data to be communicated to a corresponding application on one or more other WCDs.

* * * * *

UNITED STATES PATENT AND TRADEMARK OFFICE
CERTIFICATE OF CORRECTION

PATENT NO. : 9,596,709 B2
APPLICATION NO. : 14/489765
DATED : March 14, 2017
INVENTOR(S) : Toth et al.

It is certified that error appears in the above-identified patent and that said Letters Patent is hereby corrected as shown below:

On the Title Page

On Page 2, in item (56), under "OTHER PUBLICATIONS", in Column 2, Lines 3-4, delete "Proximity Services (ProSe)," and insert -- Proximity-based services (ProSe), --, therefor.

On Page 2, in item (56), under "OTHER PUBLICATIONS", in Column 2, Line 8, delete "Proximity Services (ProSe)," and insert -- Proximity-based services (ProSe), --, therefor.

In the Specification

In Column 1, Line 35, delete "radio area network (RAN)." and insert -- radio access network (RAN). --, therefor.

In Column 3, Line 50, delete "proximity-enabled service (ProSe)" and insert -- Proximity-based service (ProSe) --, therefor.

In Column 4, Lines 34-35, delete "identifier;" and insert -- identifier, --, therefor.

In Column 5, Line 18, delete "one more" and insert -- one or more --, therefor.

In Column 6, Line 39, delete "proximity-based (ProSe) services." and insert -- proximity-based services (ProSe). --, therefor.

In the Claims

In Column 17, Line 4, in Claim 4, delete "configured" and insert -- configured to --, therefor.

In Column 18, Line 31, in Claim 12, delete "one more" and insert -- one or more --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,596,709 B2

In Column 18, Line 47, in Claim 14, delete "claim 12," and insert -- claim 13, --, therefor.

In Column 18, Line 56, in Claim 15, delete "configured" and insert -- configured to --, therefor.

In Column 18, Line 65, in Claim 16, delete "one more" and insert -- one or more --, therefor.

In Column 19, Line 30, in Claim 18, delete "one more" and insert -- one or more --, therefor.

In Column 20, Line 11, in Claim 21, delete "second WCD" and insert -- WCD --, therefor.